US012489191B2

(12) United States Patent
Gupta et al.

(10) Patent No.: US 12,489,191 B2
(45) Date of Patent: Dec. 2, 2025

(54) COMPACT HYBRID COUPLERS HAVING STRONG BROADBAND COUPLING FOR BASE STATION ANTENNA SYSTEMS

(71) Applicant: Outdoor Wireless Networks LLC, Claremont, NC (US)

(72) Inventors: Ravi Dutt Gupta, Goa (IN); Kumara Swamy Kasani, Goa (IN); Ligang Wu, Suzhou (CN); Haiyan Chen, Suzhou (CN); Ting Zhang, Suzhou (CN); Fangwen Wan, Suzhou (CN)

(73) Assignee: Outdoor Wireless Networks LLC, Richardson, TX (US)

(*) Notice: Subject to any disclaimer, the term of this patent is extended or adjusted under 35 U.S.C. 154(b) by 127 days.

(21) Appl. No.: 18/541,759

(22) Filed: Dec. 15, 2023

(65) Prior Publication Data

US 2024/0204384 A1 Jun. 20, 2024

(30) Foreign Application Priority Data

Dec. 16, 2022 (CN) ......................... 202211623239.5

(51) Int. Cl.
*H01P 5/16* (2006.01)
*H01P 3/08* (2006.01)

(52) U.S. Cl.
CPC . *H01P 5/16* (2013.01); *H01P 3/08* (2013.01)

(58) Field of Classification Search
CPC ............... H01P 5/16; H01P 3/08; H01P 5/185
See application file for complete search history.

(56) References Cited

U.S. PATENT DOCUMENTS

| | | | | |
|---|---|---|---|---|
| 9,263,786 B2 * | 2/2016 | Suga | .................... | H03G 1/0005 |
| 10,840,607 B2 | 11/2020 | Mei et al. | | |

(Continued)

FOREIGN PATENT DOCUMENTS

| | | |
|---|---|---|
| CN | 109119765 A | 1/2019 |
| CN | 117937122 A | 4/2024 |
| WO | 2018071203 A1 | 4/2018 |

*Primary Examiner* — Quan Tra
(74) *Attorney, Agent, or Firm* — Myers Bigel, P.A.

(57) ABSTRACT

A four-port RF hybrid coupler includes a substrate having first and second primary traces and first and second coupled traces on a first surface thereof. The first coupled trace has: (i) a first end configured to provide a first degree of RF coupling to a first end of the first primary trace when the RF hybrid coupler is active, and (ii) a second end configured to provide a third degree of RF coupling to a second end of the second primary trace when the RF hybrid coupler is active. The second coupled trace has: (i) a first end configured to provide a fourth degree of RF coupling to the first end of the second primary trace when the RF hybrid coupler is active, and (ii) a second end configured to provide a second degree of RF coupling to the second end of the first primary trace when the RF hybrid coupler is active. First and second energy cancellation circuits are also provided. The first energy cancellation circuit includes a first termination coupler having an input port electrically coupled to an end of the second coupled trace, and the second energy cancellation circuit includes a second termination coupler having an input port electrically coupled to an end of the first coupled trace.

20 Claims, 13 Drawing Sheets

(56) References Cited

U.S. PATENT DOCUMENTS

| | | | | |
|---|---|---|---|---|
| 2012/0306589 | A1* | 12/2012 | Mukaiyama | H01P 5/18 333/112 |
| 2019/0173197 | A1* | 6/2019 | Li | H04B 1/0458 |
| 2022/0061160 | A1* | 2/2022 | Wang | H01Q 21/28 |
| 2023/0034066 | A1* | 2/2023 | Varnoosfaderani | H01P 5/222 |
| 2023/0238679 | A1* | 7/2023 | Bianchi | H01P 5/185 333/116 |

* cited by examiner

COMPACT HYBRID COUPLERS HAVING STRONG BROADBAND COUPLING FOR BASE STATION ANTENNA SYSTEMS

FIELD OF THE INVENTION

The present invention relates to radio communication systems and, more particularly, to base station antennas (BSAs) utilized in cellular and other communication systems.

BACKGROUND

Multi-port directional radio frequency (RF) hybrid couplers may be used to fulfill a variety of different roles within base station antenna (BSA) systems, as disclosed in commonly assigned Chinese Patent No. ZL201810242591.1, entitled "Cellular Communication Systems Having Antenna Arrays Therein with Enhanced Half Power Beam Width (HPBW) Control," and in commonly assigned Chinese Patent Application No. 202211256676.8, entitled "Massive MIMO Base Station Antenna Systems Having Hybrid Couplers Therein," the disclosures of which are hereby incorporated herein by reference. One example of such a BSA-compatible four-port hybrid coupler 100 includes a rectangular substrate 20 (e.g., printed circuit board (PCB)) having top and bottom surfaces thereon, as illustrated by FIGS. 1A and 1B, respectively. As shown by FIG. 1A, first and second primary traces 10*a*, 10*b* and first and second coupled traces 12*a*, 12*b* are provided as patterned metal traces on the top surface of the substrate 20, which may have dimensions of 159 mm (length)×85 mm (width), and as shown by FIG. 1B, a bottom surface of the substrate 20 is covered with a metal ground plane 15.

The first primary trace 10*a* includes a plurality of trace segments electrically connected in series between a first port (Port 1) and a second port (Port 2) of the coupler 100; whereas the second primary trace 10*b* includes a plurality of trace segments electrically connected in series between a fourth port (Port 4) and a third port (Port 3) of the coupler 100. The first coupled trace 12*a* includes a series combination of trace segments (and metal jumper 12*c*) that span the substrate 20 from adjacent Port 1 (and a first end of the first primary trace 10*a*) to adjacent Port 3 (and a second end of the second primary trace 10*b*); whereas the second coupled trace 12*b* includes a series combination of trace segments that span the substrate 20 from adjacent Port 4 (and a first end of the second primary trace 10*b*) to adjacent Port 2 (and second end of the first primary trace 10*a*). Moreover, based on the illustrated patterning of the primary and coupled traces, the first primary trace 10*a* is configured as a mirror-image of the second primary trace 10*b* relative to a first centerline $CL_1$ extending along a longitudinal axis of the substrate 20, and the first coupled trace 12*a* is configured as a mirror-image of the second coupled trace 12*b* relative to the first centerline $CL_1$ as well as a second centerline $CL_2$ extending along a transverse axis of the substrate 20.

SUMMARY

A BSA-compatible, compact, four-port radio-frequency (RF) hybrid coupler according to some embodiments of the invention includes a substrate, and first and second primary traces and first and second coupled traces on a first surface of the substrate. The first primary trace has first and second ends electrically coupled to first and second ports of the coupler, respectively, and the second primary trace has first and second ends electrically coupled to fourth and third ports of the coupler, respectively. The first coupled trace has: (i) a first end including a plurality of trace segments connected in series, which collectively provide a first degree of RF coupling to the first end of the first primary trace adjacent the first port when the coupler is active, and (ii) a second end including a plurality of trace segments connected in series, which collectively provide a third degree of RF coupling to the second end of the second primary trace adjacent the third port when the coupler is active; the first coupled trace is configured such that the third degree of RF coupling is unequal to the first degree of RF coupling. The second coupled trace has: (i) a first end including a plurality of trace segments connected in series, which collectively provide a fourth degree of RF coupling to the first end of the second primary trace adjacent the fourth port when the coupler is active, and (ii) a second end including a plurality of trace segments connected in series, which collectively provide a second degree of RF coupling to the second end of the first primary trace adjacent the second port when the coupler is active; the second coupled traces is configured such that the second degree of RF coupling is unequal to the fourth degree of RF coupling.

In some of these embodiments, the first and fourth ports extend adjacent a first side of the substrate, and the second and third ports extend adjacent a second side of the substrate, opposite the first side. Advantageously, the substrate may be a relatively small rectangular-shaped substrate having lateral dimensions of less than about 130 mm (length) by less than about 75 mm (width) to yield an area of less than about 10,000 $mm^2$. In addition, the first end of the first coupled trace may be configured as a mirror-image of a first end of the second coupled trace, relative to a first centerline extending between the first and second primary traces, and the second end of the first coupled trace may be configured as a mirror-image of a second end of the second coupled trace, relative to the first centerline. However, to achieve the above-described asymmetric coupling characteristics between the first and third ports and between the second and fourth ports, the first end of the first coupled trace may not be a mirror-image of a second end of the second coupled trace, relative to a second centerline extending between the first and second ports of the coupler, and the first end of the second coupled trace may not be a mirror-image of a second end of the first coupled trace, relative to the second centerline.

According to another embodiment of the invention, the first coupled trace may be configured to include a first pair of serpentine-shaped trace segments, which are electrically coupled in series with each other. Likewise, the second coupled trace may be configured to include a second pair of serpentine-shaped trace segments, which are electrically coupled in series with each other. In some embodiments, either the first pair of serpentine-shaped trace segments may be electrically connected end-to-end by an electrically conductive jumper, which is spaced above the first surface of the substrate, or the second pair of serpentine-shaped trace segments may be electrically connected end-to-end by the electrically conductive jumper. In addition, the first pair of serpentine-shaped trace segments may extend in series and between the first and second ends of first coupled trace, and the second pair of serpentine-shaped trace segments may extend in series and between the first and second ends of second coupled trace.

According to further embodiments of the invention, the first end of the first primary trace may include first and second linear trace segments that are joined together by an elbow-shaped trace segment, and the first end of the first coupled trace may also include first and second linear trace segments that are joined together by an elbow-shaped trace segment. Moreover, the first and second linear trace segments within the first primary trace may extend parallel to the first and second linear trace segments within the first coupled trace, respectively.

According to additional embodiments of the invention, a ground plane may be provided on a second surface of the substrate, and this ground plane may include a "defected" ground structure (DGS) as an opening therein that improves coupling between an end of a primary trace and an end of a corresponding coupled trace. In some embodiments, this DGS may be configured as a polygonal-shaped opening within the ground plane, and in other embodiments the DGS may be configured as a rectangular-shaped, ladder-shaped or similar opening that extends opposite a parallel combination of the second linear trace segment within the first primary trace and the second linear trace segment within the first coupled trace. And, in other embodiments, a dielectric loading element, such as a rectangular-shaped loading element, may be provided that covers at least a portion of a parallel combination of the second linear trace segment within the first primary trace and the second linear trace segment within the first coupled trace. A first pair of phase delay lines may also be provided, which are electrically connected to spaced-apart locations on the first primary trace, and a second pair of phase delay lines may be provided, which are electrically connected to spaced-apart locations on the second primary trace. In addition, terminal ends of each of the first pair of phase delay lines and terminal ends of each of the second pair of phase delay lines may be electrically shorted through the substrate to the ground plane on the second surface of the substrate.

In still further embodiments of the invention, a four-port radio-frequency (RF) hybrid coupler may include a substrate, and first through fourth power dividers on the substrate, which have corresponding first through fourth input ports that correspond to first through fourth ports of the coupler, and corresponding first through fourth pairs of output ports. A first primary trace is provided on the substrate, which electrically connects a first output port of the first power divider to a first output port of the second power divider. A second primary trace is provided on the substrate, which electrically connects a first output port of the fourth power divider to a first output port of the third power divider. A first coupled trace is provided, which electrically connects a second output port of the first power divider to a second output port of the third power divider, and a second coupled trace is provided, which electrically connects a second output port of the fourth power divider to a second output port of the second power divider. In some embodiments, a layout of the first power divider is a mirror-image of a layout of the fourth power divider, relative to a first centerline of the substrate, which extends between the first and second power dividers on one side and the fourth and third power dividers on another side. In addition, a layout of the second power divider is a mirror-image of a layout of the third power divider, relative to the first centerline. The layout of the first power divider may also be a mirror-image of the layout of the second power divider, relative to a second centerline of the substrate, which extends between the first and fourth power dividers on one side and the second and third power dividers on another side. The layout of the fourth power divider may also be a mirror-image of the layout of the third power divider, relative to the second centerline.

According to additional embodiments of the invention, the first and second primary traces may be configured as mirror-images of each other relative to the first centerline, and the first and second coupled traces may be configured as mirror-images of each other relative to the first centerline. In addition, an electrically conductive jumper is provided, which enables the first coupled trace to jump over the second coupled trace, or vice versa. In some embodiments, the first through fourth power dividers may be configured as single-section Wilkinson power dividers or as multi-section Wilkinson power dividers, which may each include first section with trace segments having a first width and a second section with trace segments having a second width greater than the first width.

Still further embodiments of the invention may include a four-port radio-frequency (RF) hybrid coupler having a pair of primary traces, a pair of coupled traces and a pair of energy cancellation circuits therein. According to these embodiments, a first primary trace is provided on a first surface of the substrate, and has first and second ends electrically coupled to first and second ports of the RF hybrid coupler, respectively. Similarly, a second primary trace is provided on the first surface of the substrate, and has first and second ends electrically coupled to fourth and third ports of the RF hybrid coupler, respectively. A first coupled trace, which is provided on the first surface of the substrate, includes: (i) a first end configured to provide a first degree of RF coupling to the first end of the first primary trace adjacent the first port when the RF hybrid coupler is active, and (ii) a second end configured to provide a third degree of RF coupling to the second end of the second primary trace adjacent the third port when the RF hybrid coupler is active. A second coupled trace, which is provided on the first surface of the substrate, includes: (i) a first end configured to provide a fourth degree of RF coupling to the first end of the second primary trace adjacent the fourth port when the RF hybrid coupler is active, and (ii) a second end configured to provide a second degree of RF coupling to the second end of the first primary trace adjacent the second port when the RF hybrid coupler is active. Advantageously, a first energy cancellation circuit (ECC) is provided, which includes a first termination coupler having an input port electrically coupled to the second end of the second coupled trace; and a second ECC is provided, which includes a second termination coupler having an input port electrically coupled to the second end of the first coupled trace. In some of these embodiments, the first termination coupler is configured as a four-port coupler having through, coupling and isolation ports terminated by respective resistors. In some embodiments, the resistors terminating the through and coupling ports of the first termination coupler may be relatively high-power resistors, and the resistor terminating the isolation port may be a relatively low-power resistor. The first termination coupler may also be selected from a group consisting of: 3 dB branch-line couplers and 3 dB coupled-line couplers. According to further embodiments, the first and second termination couplers may have matching gain and phase characteristics.

DETAILED DESCRIPTION

Figure 1A:
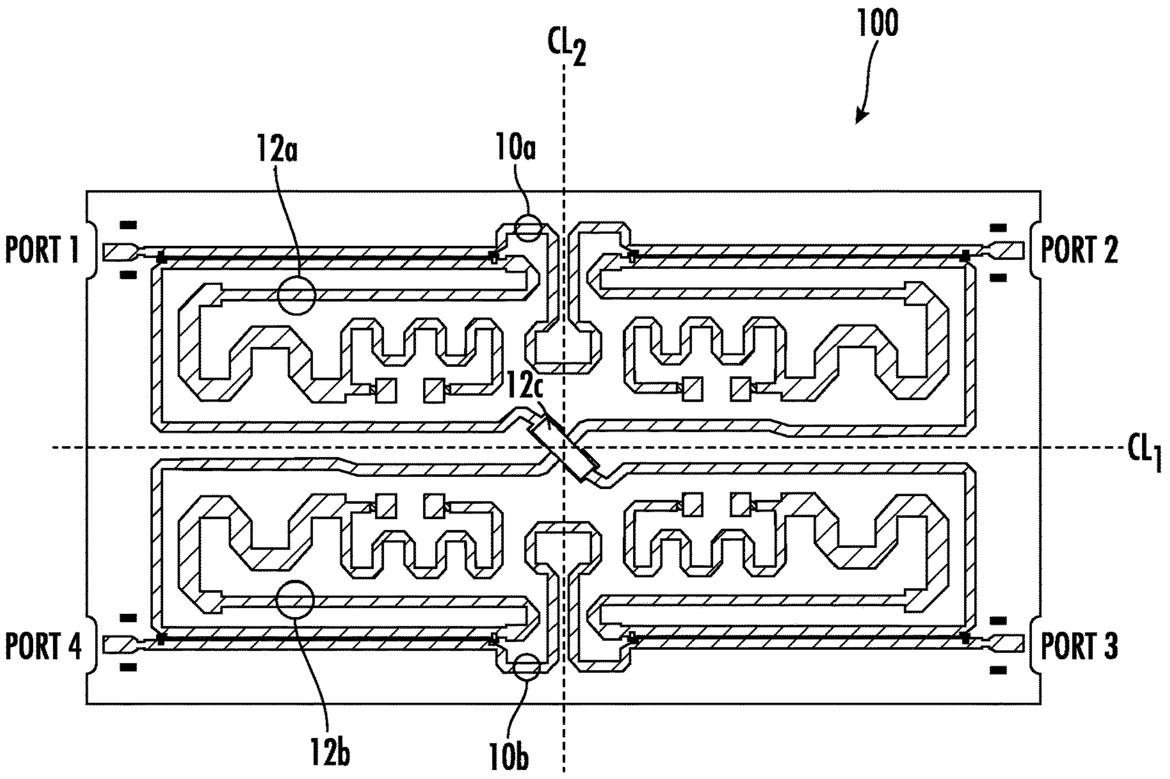
FIG. 1A (PRIOR ART)
FIGS. 1A-1B are top and bottom plan views, respectively, of a conventional 4-port radio frequency (RF) hybrid coupler.
Figure 1B:
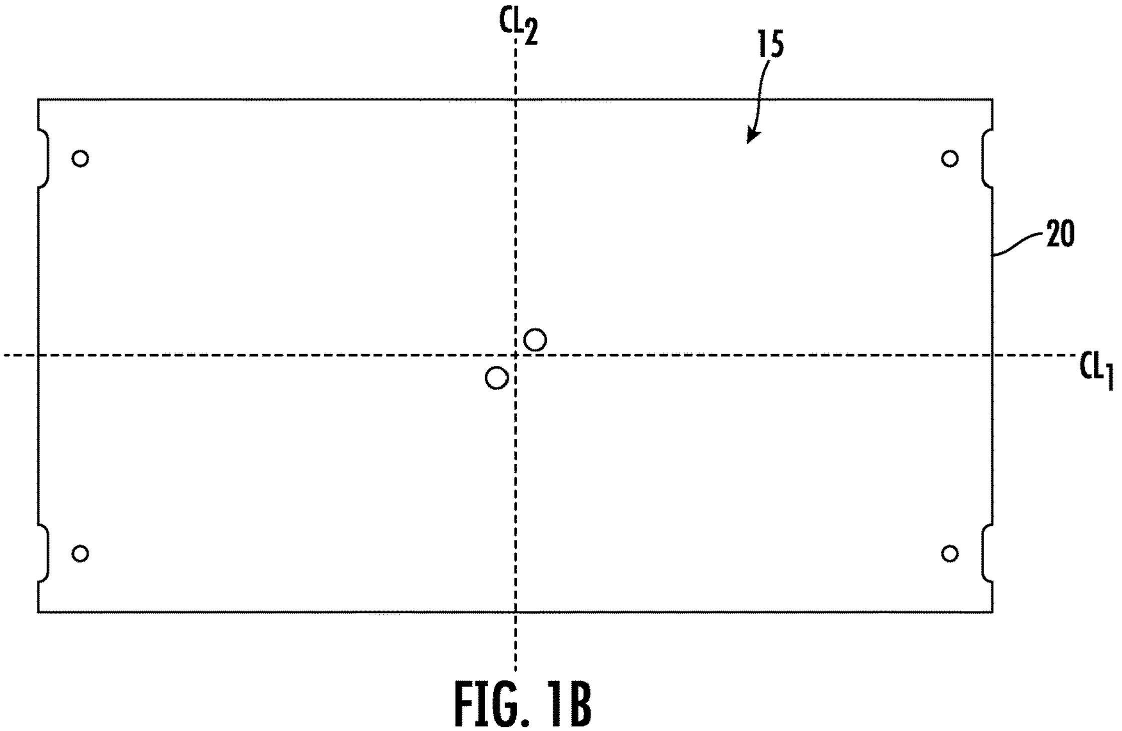
FIG. 1B (PRIOR ART)

The present invention now will be described more fully with reference to the accompanying drawings, in which preferred embodiments of the invention are shown. This invention may, however, be embodied in many different forms and should not be construed as being limited to the embodiments set forth herein; rather, these embodiments are provided so that this disclosure will be thorough and complete, and will fully convey the scope of the invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a," "an" and "the" are intended to include the plural forms as well, unless the context clearly indicates otherwise. It will be further understood that the terms "comprising", "including", "having" and variants thereof, when used in this specification, specify the presence of stated features, steps, operations, elements, and/or components, but do not preclude the presence or addition of one or more other features, steps, operations, elements, components, and/or groups thereof. In contrast, the term "consisting of" when used in this specification, specifies the stated features, steps, operations, elements, and/or components, and precludes additional features, steps, operations, elements and/or components.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2A:
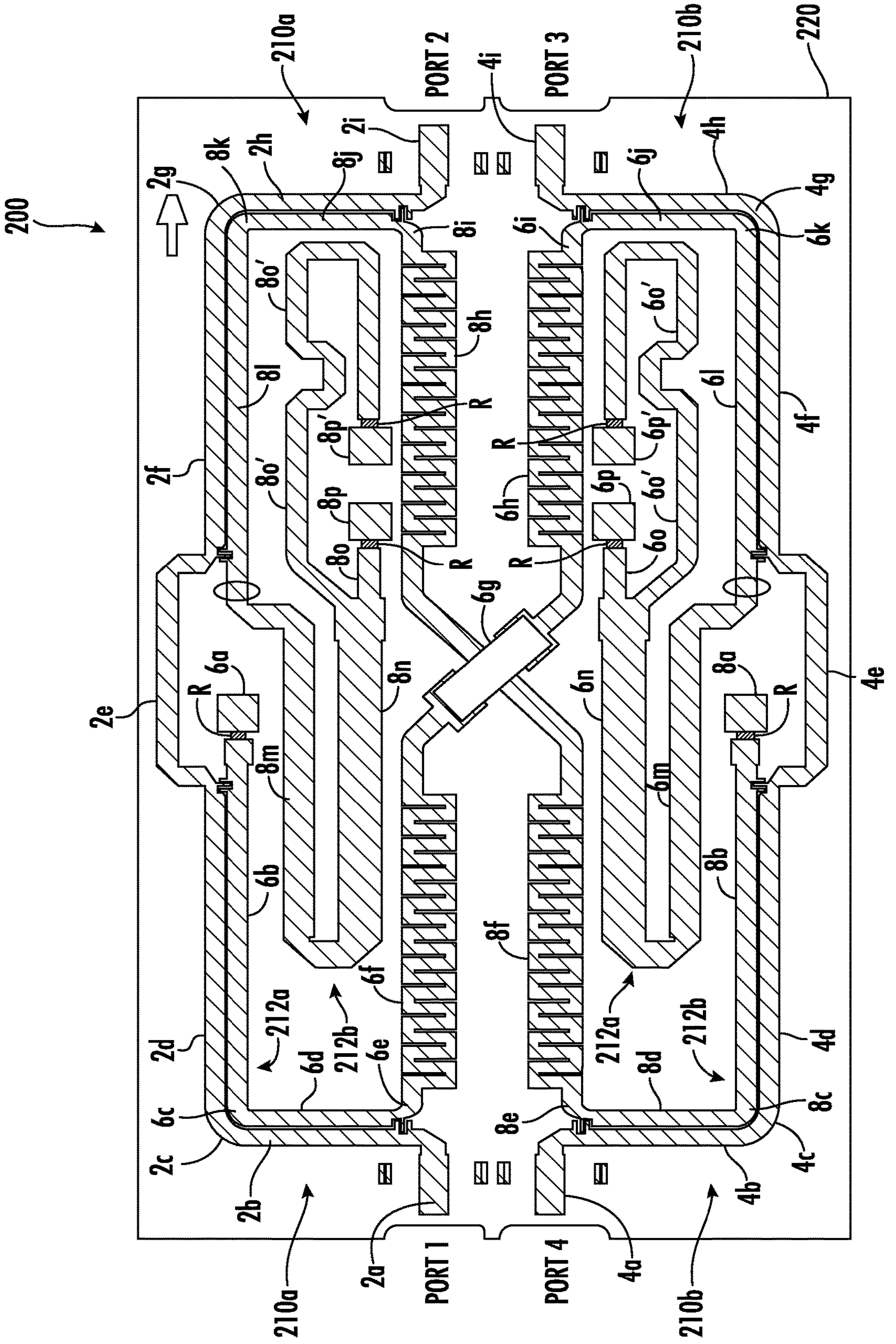
FIG. 2A is a top plan view of a 4-port hybrid coupler according to an embodiment of the invention.
Figure 2B:
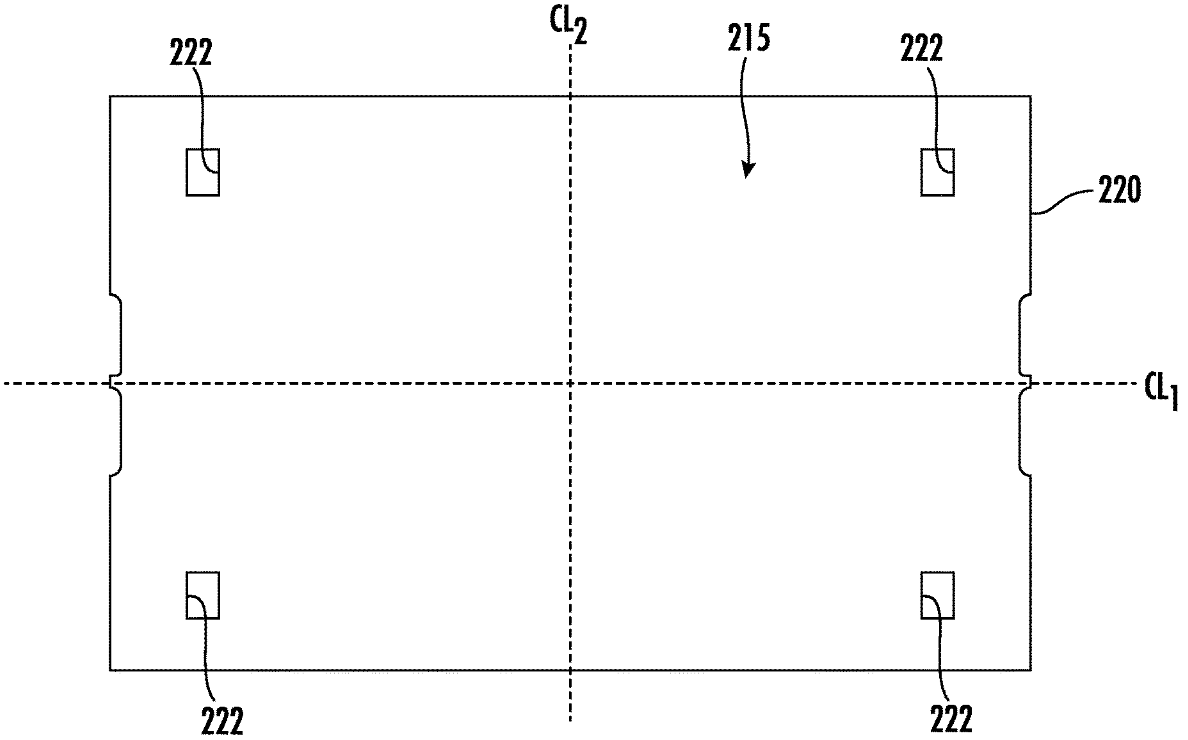
FIGS. 2B-2C are alternative bottom plan views of the 4-port hybrid coupler of FIG. 2A.
Figure 2C:
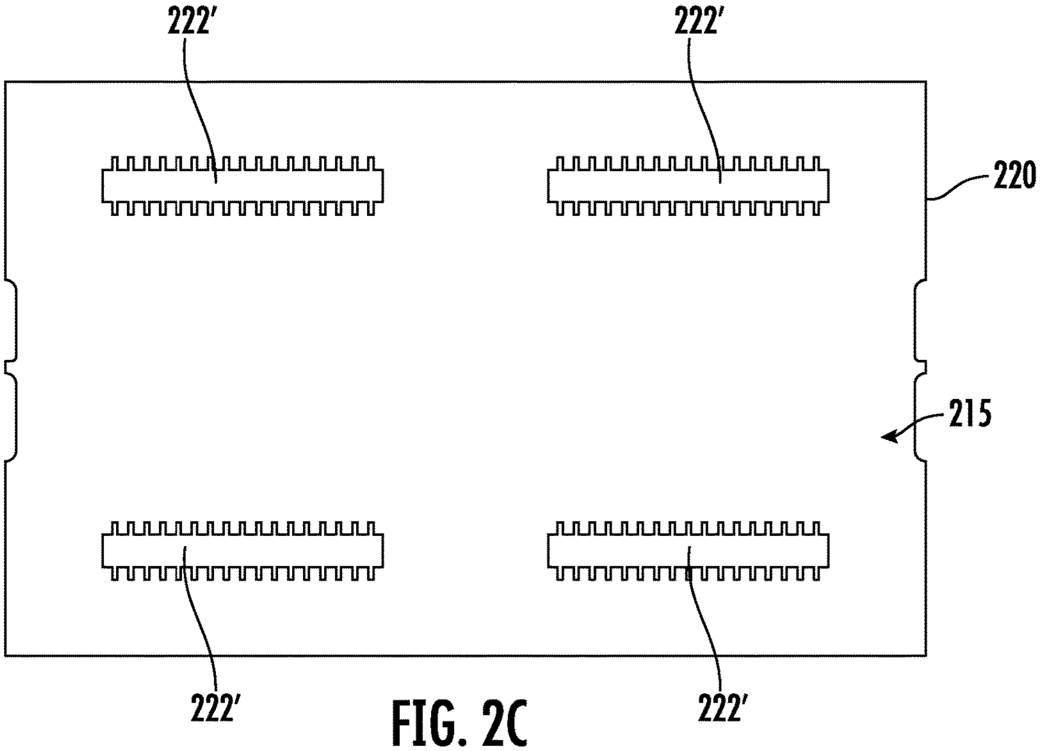

Referring now to FIGS. 2A-2C, a 4-port radio frequency (RF) hybrid coupler 200 according to an embodiment of the invention is illustrated as including a rectangular substrate 220, such as a PCB substrate, having top and bottom surfaces thereon. As shown by FIG. 2A, first and second primary traces 210*a*, 210*b* and first and second coupled traces 212*a*, 212*b* are provided as patterned metal traces on the top surface of the substrate 220, which may have relatively compact lateral dimensions of less than about 130 mm (length) by less than about 75 mm (width) to yield an area of less than about 10,000 $mm^2$. For example, in the illustrated embodiment, the rectangular substrate 220 may have reduced dimensions of about 115 mm×60 mm.

Advantageously, these reduced dimensions may be achieved by locating a pair of ports on each side of the substrate 220 closer together and then using 90° and elbow-shaped trace segments within the first and second primary traces 210*a*, 210*b* and corresponding first and second coupled traces 212*a*, 212*b* to obtain a smaller overall trace layout "footprint" (while maintaining sufficient primary and coupled trace length), as described hereinbelow. The illustrated layout footprint may also be best suited for RF frequencies in a band from about 696 MHz to about 960 MHz, however, other frequency bands may also be used.

In addition, the first primary trace 210*a* has first and second ends electrically connected to first and second ports of the coupler 200, respectively, which are shown as Port 1 and Port 2, and the second primary trace 210*b* has first and second ends electrically connected to fourth and third ports of the coupler 200, respectively, which are shown as Port 4 and Port 3. The first coupled trace 212*a* has a first end that is RF coupled to the first end of the first primary trace 210*a* (adjacent Port 1) and a second end that is RF coupled to the second end of the second primary trace 210*b* (adjacent Port 3). Similarly, the second coupled trace 212*b* has a first end that is RF coupled to the first end of the second primary trace 210*b* (adjacent Port 4) and a second end that is RF coupled to the second end of the first primary trace 210*a* (adjacent Port 2). Moreover, as will be understood by those skilled in the art, each of the primary and coupled traces is configured as a corresponding plurality of metal trace segments of different shapes, lengths and widths, which are electrically connected in series between their respective ends, as shown.

Thus, in the illustrated embodiment, the first primary trace 210*a* is configured to include the following trace segments: a first port segment 2*a*, a first linear segment 2*b*, a first elbow-shaped segment 2*c*, a second linear segment 2*d*, a third linear segment 2*e*, a fourth linear segment 2*f*, a second elbow-shaped segment 2*g*, a fifth linear segment 2*h*, and a second port segment 2*i*. In addition, the first port segment 2*a* and the first linear segment 2*b* are joined by a 90° corner segment, the second linear segment 2*d* and third linear segment 2*e* are joined by a pair of 90° corner segments, the third linear segment 2*e* and fourth linear segment 2*f* are joined by a pair of 90° corner segments, and the fifth linear segment 2*h* and the second port segment 2*i* are joined by a 90° corner segment, as illustrated. Likewise, the second primary trace 210*b*, which is a mirror-image of the first primary trace 210*a* (about a first centerline $CL_1$), is configured to include the following trace segments: a fourth port segment 4*a*, a first linear segment 4*b*, a first elbow-shaped segment 4*c*, a second linear segment 4*d*, a third linear segment 4*e*, a fourth linear segment 4*f*, a second elbow-shaped segment 4*g*, a fifth linear segment 4*h*, and a third port segment 4*i*. In addition, the fourth port segment 4*a* and the first linear segment 4*b* are joined by a 90° corner segment, the second linear segment 4*d* and third linear segment 4*e* are joined by a pair of 90° corner segments, the third linear segment 4*e* and fourth linear segment 4*f* are joined by a pair of 90° corner segments, and the fifth linear segment 4*h* and the third port segment 4*i* are joined by a 90° corner segment, as illustrated.

Referring still to FIG. 2A, the first coupled trace 212*a* has: (i) a first end including a plurality of trace segments connected in series, which collectively provide a first degree of RF coupling to the first end of the first primary trace 210*a* adjacent Port 1 when the coupler 200 is active (i.e., operating with RF signals), and (ii) a second end including a plurality of trace segments connected in series, which collectively provide a third degree of RF coupling to the second end of the second primary trace 210*b* adjacent Port 3 when the coupler is active. As explained more fully hereinbelow, the first and second ends of the first coupled trace 212*a* are configured differently (e.g., asymmetrically) such that the third degree of RF coupling is preferably less than the first degree of RF coupling.

Likewise, the second coupled trace 212*b* has: (i) a first end including a plurality of trace segments connected in series, which collectively provide a fourth degree of RF coupling to the first end of the second primary trace 210*b* adjacent Port 4 when the coupler 200 is active, and (ii) a second end including a plurality of trace segments connected in series, which collectively provide a second degree of RF coupling to the second end of the first primary trace 210*a* adjacent Port 2 when the coupler 200 is active. In addition, the first and second ends of the second coupled trace 212*b* are configured differently/asymmetrically such that the fourth degree of RF coupling is preferably less than the second degree of RF coupling.

In particular, the first end of the first coupled trace 212*a* is configured to include the following trace segments: a first end termination 6*a*, a first linear segment 6*b*, which is connected to the first end termination 6*a* by a resistor R, a first elbow-shaped segment 6*c*, a second linear segment 6*d*, a second elbow-shaped segment 6*e*, and a first serpentine-shaped segment 6*f*. In contrast, the second end of the first coupled trace 212*a* is configured to include the following trace segments: a pair of end terminations 6*p*, 6*p*', which are electrically coupled by resistors R and unequal length metal traces 60, 60' to a relatively wide first linear segment 6*n*, a second linear segment 6*m*, which is electrically connected by a pair of 90° corner segments to the relatively wide first linear segment 6*n*, a third linear segment 6*l*, which is electrically connected by a pair of 90° corner segments to the second linear segment 6*m*, a first elbow-shaped segment 6*k*, a fourth linear segment 6*j*, a second elbow-shaped segment 6*i*, and a second serpentine-shaped segment 6*h*, which is electrically connected by a jumper segment 6*g* to the first serpentine-shaped segment 6*f*. Advantageously, these paired serpentine-shaped segments have a slow wave characteristic that provides for sufficient phase compensation.

Similarly, the first end of the second coupled trace 212*b* is configured to include the following trace segments: a first end termination 8*a*, a first linear segment 8*b*, which is connected to the first end termination 8*a* by a resistor R, a first elbow-shaped segment 8*c*, a second linear segment 8*d*, a second elbow-shaped segment 8*e*, and a first serpentine-shaped segment 8*f*. In contrast, the second end of the second coupled trace 212*b* is configured to include the following trace segments: a pair of end terminations 8*p*, 8*p*', which are electrically coupled by resistors R and unequal length metal traces 8*o*, 8*o*' to a relatively wide first linear segment 8*n*, a second linear segment 8*m*, which is electrically connected by a pair of 90° corner segments to the relatively wide first linear segment 8*n*, a third linear segment 8*l*, which is electrically connected by a pair of 90° corner segments to the second linear segment 8*m*, a first elbow-shaped segment 8*k*, a fourth linear segment 8*j*, a second elbow-shaped segment 8*i*, and a second serpentine-shaped segment 8*h*, which is electrically connected (without a jumper segment) to the first serpentine-shaped segment 8*f*; however, the placement of the jumper segment 6*g* may be reversed between the first and second coupled traces in an alternative embodiment.

Based on these illustrated configurations of the first and second coupled traces 212*a*, 212*b* a mirror-image equivalency is present between the first coupled trace 212*a* and the second coupled trace 212*b* relative to the first centerline $CL_1$. Nonetheless, an asymmetry in the degree of coupling is present between the ends of the first and second coupled traces 212*a*, 212*b* relative to the corresponding ends of the first and second primary traces 210*a*, 210*b* (and corresponding ports) because a mirror-image equivalency is not present between the first coupled trace 212*a* and the second coupled trace 212*b* relative to a second centerline $CL_2$, which is located equidistant from Port 1, Port 4 on one side of the substrate 220 and Port 2, Port 3 on an opposite side of the substrate 220.

Next, as shown by FIG. 2B, a ground plane 215 may be provided that entirely covers the bottom surface of the substrate 220, with the exception of four rectangular-shaped cut-out regions 222, which extend opposite the corresponding and closely "paired" elbow-shaped segments (2*c*, 6*c*), (2*g*, 8*k*), (4*c*, 8*c*) and (4*g*, 6*k*) of the first and second primary traces 210*a*, 210*b* and the first and second coupled traces 212*a*, 212*b* on the top surface of the substrate 220, and provide for a defected ground structure (DGS). Although not wishing to be bound by any theory, the presence of these cut-out regions 222 may operate to: (i) reduce capacitance between the "paired" elbow-shaped segments (2*c*, 6*c*), (2*g*, 8*k*), (4*c*, 8*c*) and (4*g*, 6*k*) and the ground plane 215, and (ii) boost RF coupling between the primary and coupled traces. As shown by FIG. 2C, in another embodiment, the DGS may be configured as a quad-arrangement of ladder-shaped openings 222' within the ground plane 215, which extend opposite corresponding linear trace segments within the first and second primary traces 210*a*, 210*b* and the first and second coupled traces 212*a*, 212*b* and provide for even lower capacitance and further boosted RF coupling relative to the embodiment of FIG. 2B.

Figure 3A:
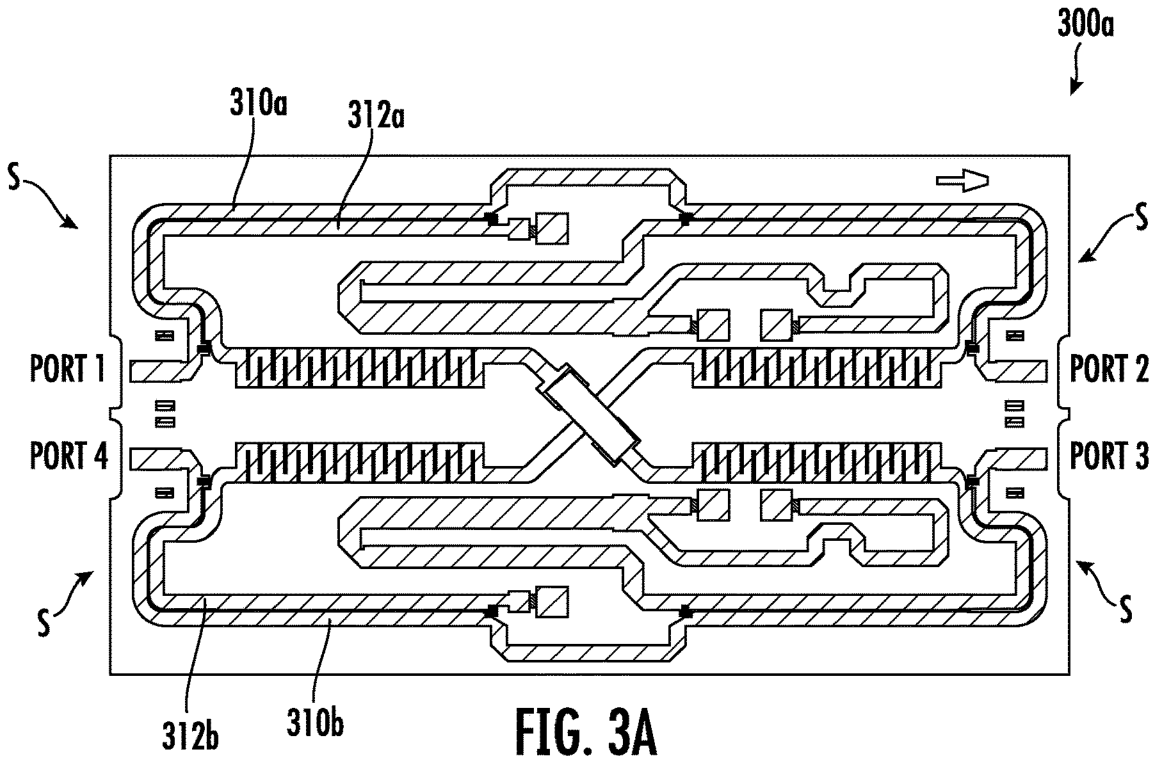
FIG. 3A is a top plan view of a 4-port hybrid coupler according to an embodiment of the invention.
Figure 3B:
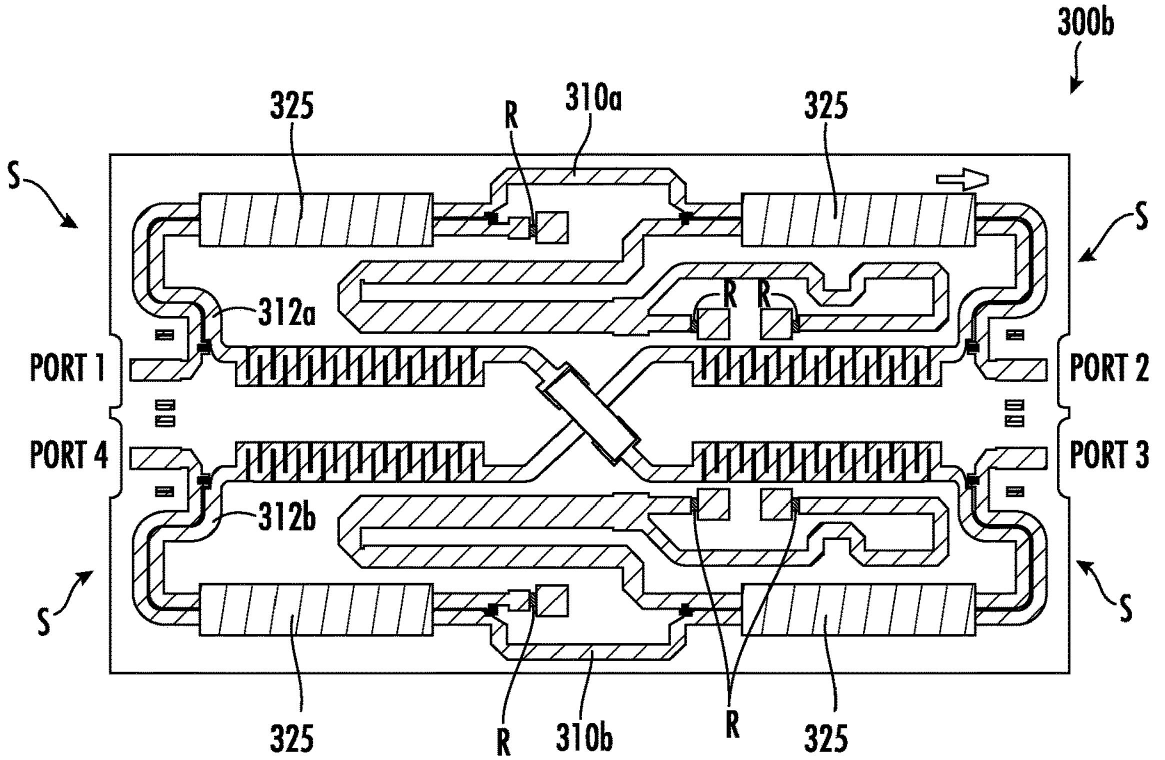
FIG. 3B is a top plan view of a 4-port hybrid coupler according to an embodiment of the invention.
Figure 3C:
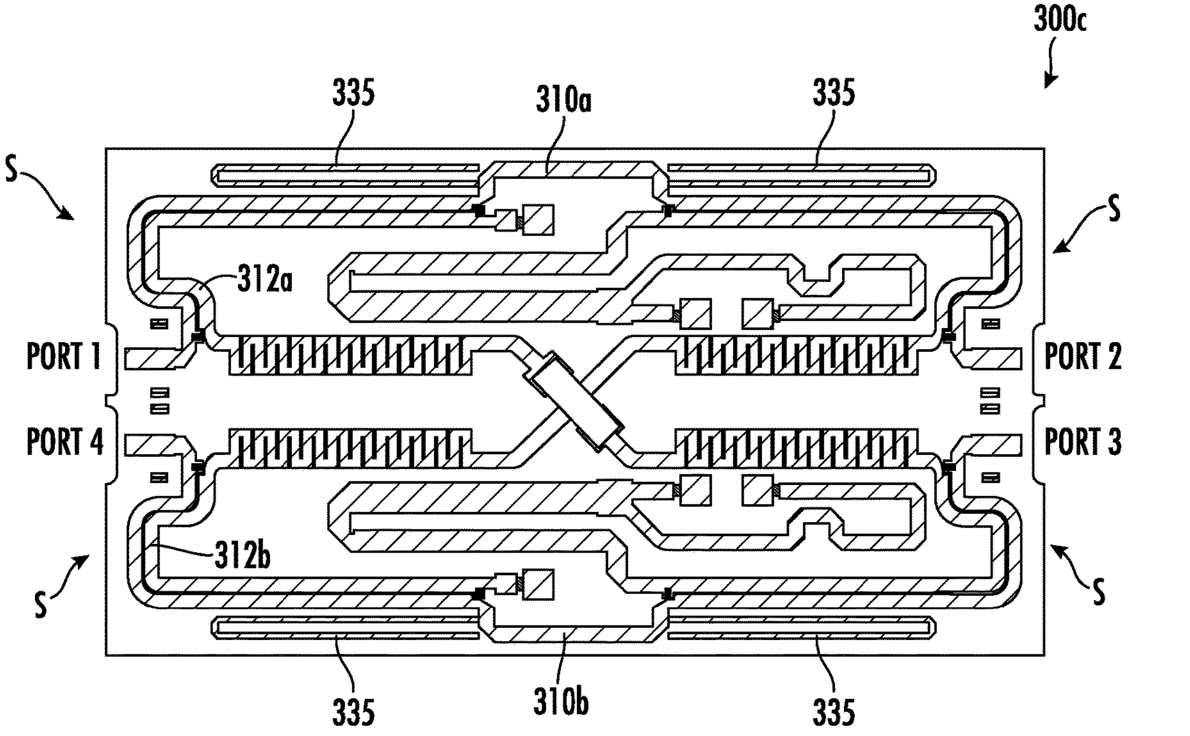
FIG. 3C is a top plan view of a 4-port hybrid coupler according to an embodiment of the invention.
Figure 3D:
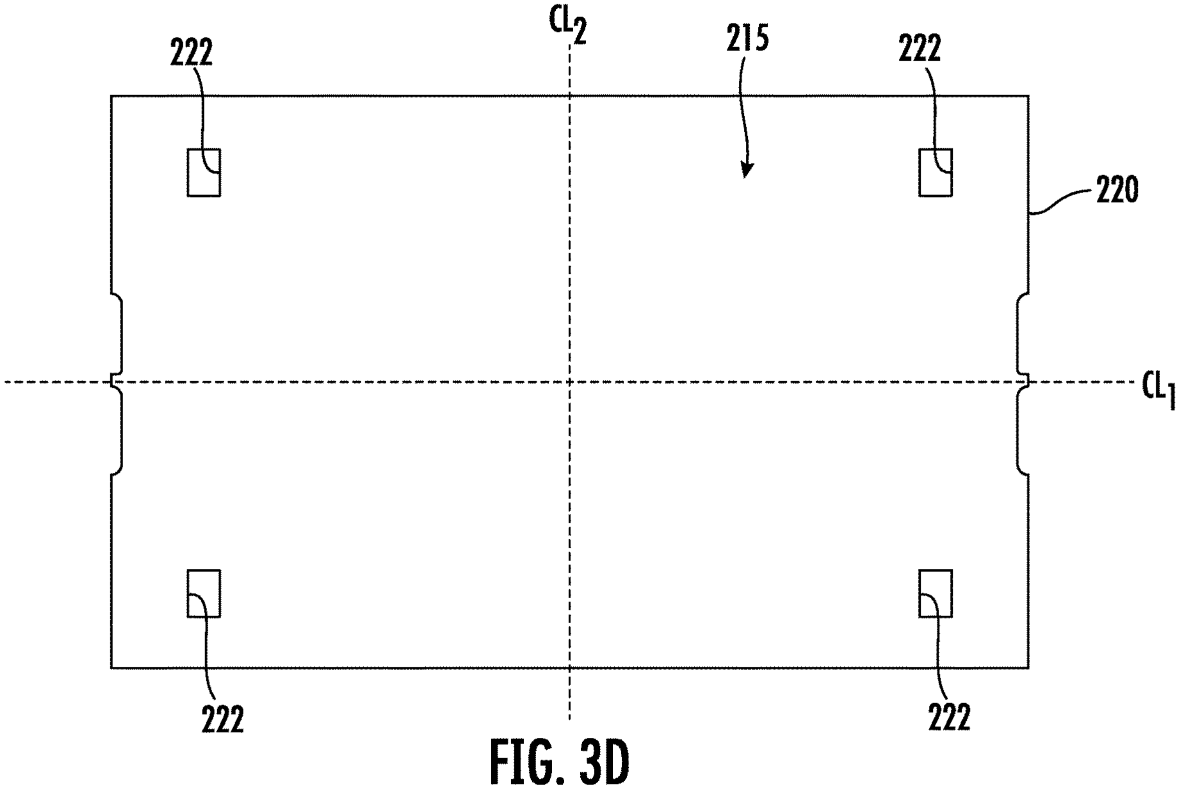
FIG. 3D is a bottom plan view of the 4-port hybrid coupler of FIGS. 3A-3C.

Referring now to FIGS. 3A-3D, three alternative examples of a 4-port radio frequency (RF) hybrid coupler 300*a*, 300*b*, 300*c* according to embodiments of the invention are illustrated as being very similar to the coupler 200 of FIGS. 2A-2B, but with various layout modifications and additions that enable improved RF performance and also support RF frequencies in a relatively wide band from about 617 MHz to about 960 MHZ. In particular, as highlighted in FIGS. 3A-3C, the ends of the primary traces 310*a*, 310*b* (and corresponding portions of the coupled traces 312*a*, 312*b*) extending adjacent Port 1, Port 4 and Port 2, Port 3 use a generally S-shaped trace segment "S" to increase the effective lengths of the primary (and coupled) traces adjacent the four ports relative to the corresponding traces in FIG. 2A; however, the other trace segments remain generally the same as shown in FIG. 2A, and need not be further described herein. Although not wishing to be bound by any theory, the increase in effective lengths of the primary (and coupled) traces enables the couplers 300*a*, 300*b*, and 300*c* to support a somewhat wider band of frequencies relative to the coupler 200 of FIG. 2A. Notwithstanding these changes, a ground plane 215 may be provided that entirely covers the bottom surface of the substrate 220, with the exception of four rectangular-shaped cut-out regions 222, as shown by FIG. 3D and described more fully hereinabove with respect to FIG. 2C.

Furthermore, as illustrated by FIG. 3B, rectangular-shaped dielectric loading elements 325 may be provided on portions of the closely "coupled" primary and coupled trace segments, in order to improve the directivity of the coupler 300*b* across the wider frequency band, for example. In some embodiments, these loading elements 325 may be configured from a material having a similar dielectric constant to the material within the underlying substrate 220. And, as illustrated by the coupler 300*c* of FIG. 3C, relatively long U-shaped phase delay lines 335, which are electrically connected to spaced-apart locations on the first and second primary traces 310*a*, 310*b* and terminated by short-circuited stubs (not shown) to the ground plane 315 on the second surface of the substrate 320, may be used to help mitigate against any phase imbalances between the output ports (Port 2, Port 3).

Figure 4A:
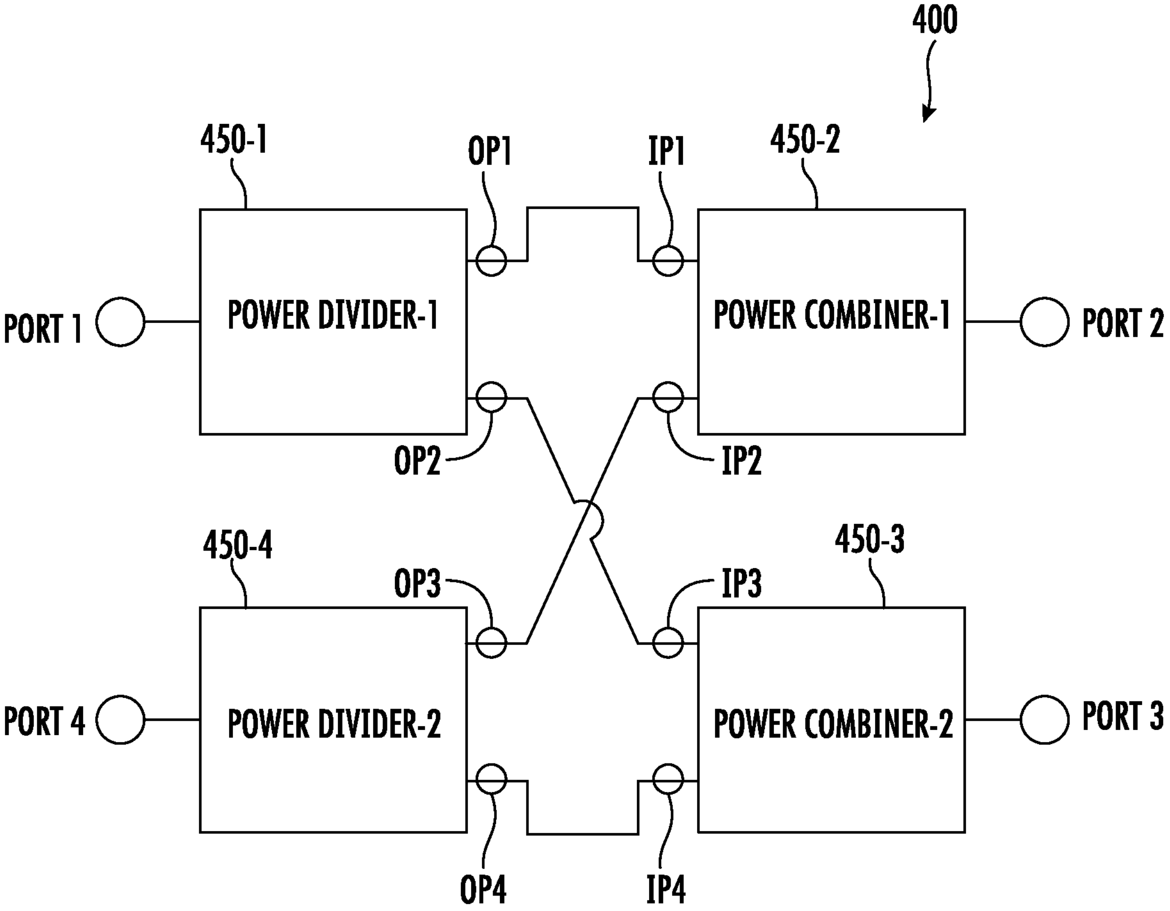
FIG. 4A is a block diagram of a 4-port hybrid coupler according to an embodiment of the invention.

Referring now to FIG. 4A, a generalized block diagram of a 4-port RF hybrid coupler 400 according to another embodiment of the invention is illustrated as including a pair of power dividers 450_1, 450_4, which are coupled to Ports 1, 4, and a pair of power combiners 450_2, 450_3, which are coupled to Ports 2, 3. In some embodiments, and as shown below, these dividers and combiners may be configured as Wilkinson power dividers/90° or 180° hybrid couplers, in both single section and multi-section, etc. As shown, the pair of power dividers 450_1, 450_4 produce output signals at corresponding output ports OP1, OP2, OP3 and OP4, whereas the pair of power combiners 450_2, 450_3 receive input signals at corresponding input ports IP1, IP2, IP3 and IP4, which are electrically coupled by metal traces to corresponding ones of the output ports OP1, OP2, OP3 and OP4, as described more fully hereinbelow in some embodiments.

Figure 4B:
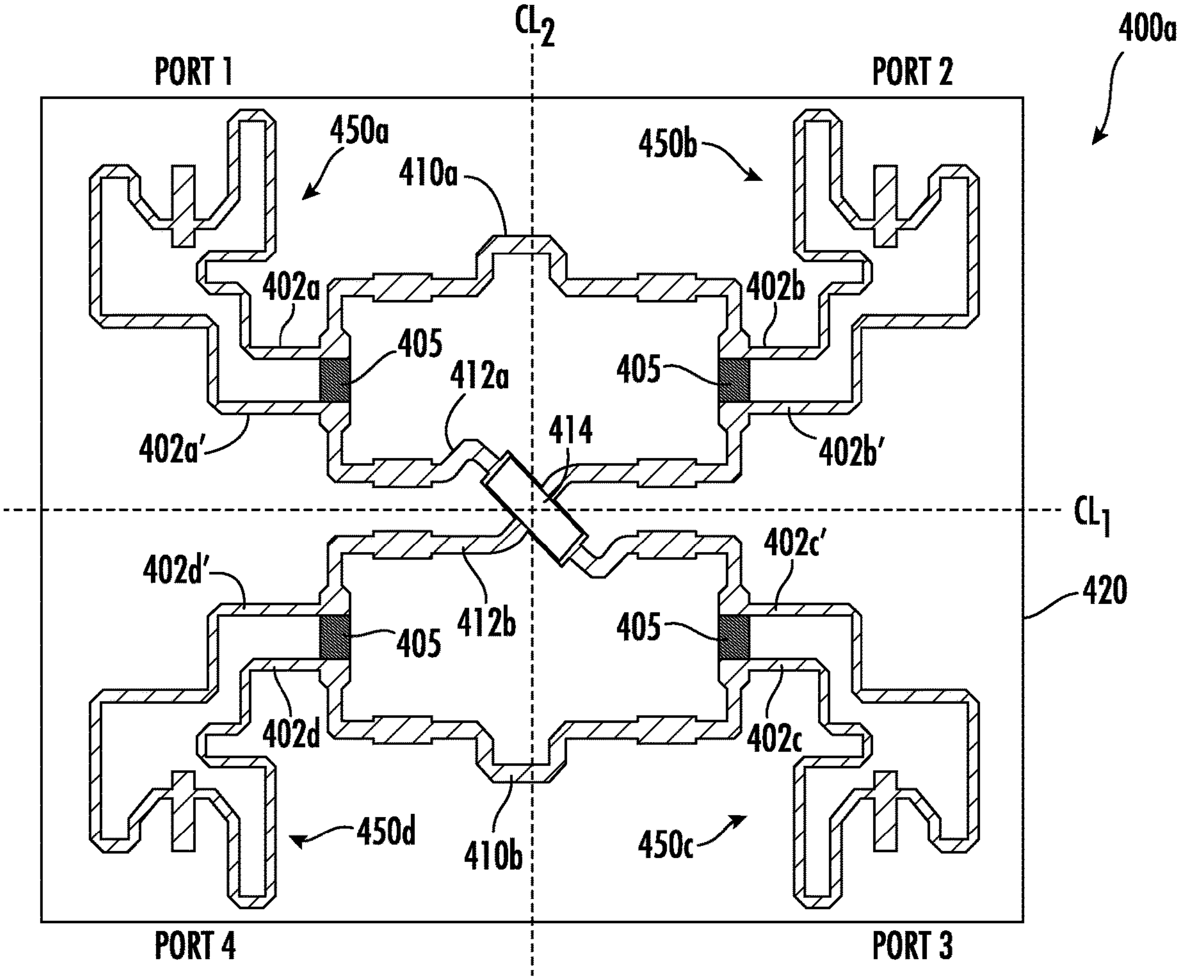
FIG. 4B is a top plan view of a 4-port hybrid coupler with single-section Wilkinson power dividers, according to an embodiment of the invention.

In particular, as shown by FIG. 4B, a first embodiment of the coupler 400 of FIG. 4A is illustrated as a hybrid coupler 400*a*, which provides relatively high RF coupling across a frequency band from about 696 MHz to about 960 MHz, for example, utilizes a quad-arrangement of single-section Wilkinson power dividers 450*a*, 450*b*, 450*c*, 450*d* having respective input ports corresponding to Port 1 through Port 4 of a substrate 420, and respective first through fourth pairs of output ports (402*a*, 402*a*'), (402*b*, 402*b*'), (402*c*, 402*c*') and (402*d*, 402*d*'), which provide equal output ratios and are electrically coupled to each other via corresponding high resistance trace segments 405 (e.g., 100 Ohm resistors). Although not wishing to be bound by any theory, the use of relatively high-coupling hybrid couplers 400*a*, 400*b* may provide a cost advantage by reducing a total number of coupling substrates (e.g., PCB substrates) that are required to achieve a desired/narrow beamwidth in a multi-column BSA, relative to low-coupling hybrid couplers (see, e.g., FIGS. 2A-2C and 3A-3D).

In addition, a first primary trace 410*a* is provided, which electrically connects a first output port 402*a* of the first power divider 450*a* to a first output port 402*b* of the second power divider 450*b*, and a second primary trace 410*b* is provided, which electrically connects a first output port 402*d* of the fourth power divider 450*d* to a first output port 402*c* of the third power divider 450*c*. A first coupled trace 412*a* is provided, which electrically connects a second output port 402*a*' of the first power divider 450*a* to a second output port 402*c*' of the third power divider 450*c* (via a jumper segment 414), and a second coupled trace 412*b* is provided, which electrically connects a second output port 402*d*' of the fourth power divider 450*d* to a second output port 402*b*' of the second power divider 450*b*. As shown, the first and second primary traces 410*a*, 410*b* and the first and second coupled traces 412*a*, 412*b* are mirror images of each other about a first centerline $CL_1$ of the substrate 420, as shown. And, the first and second coupled traces 412*a*, 412*b* are mirror images of each other about a second centerline $CL_2$ of the substrate, as shown.

Figure 4C:
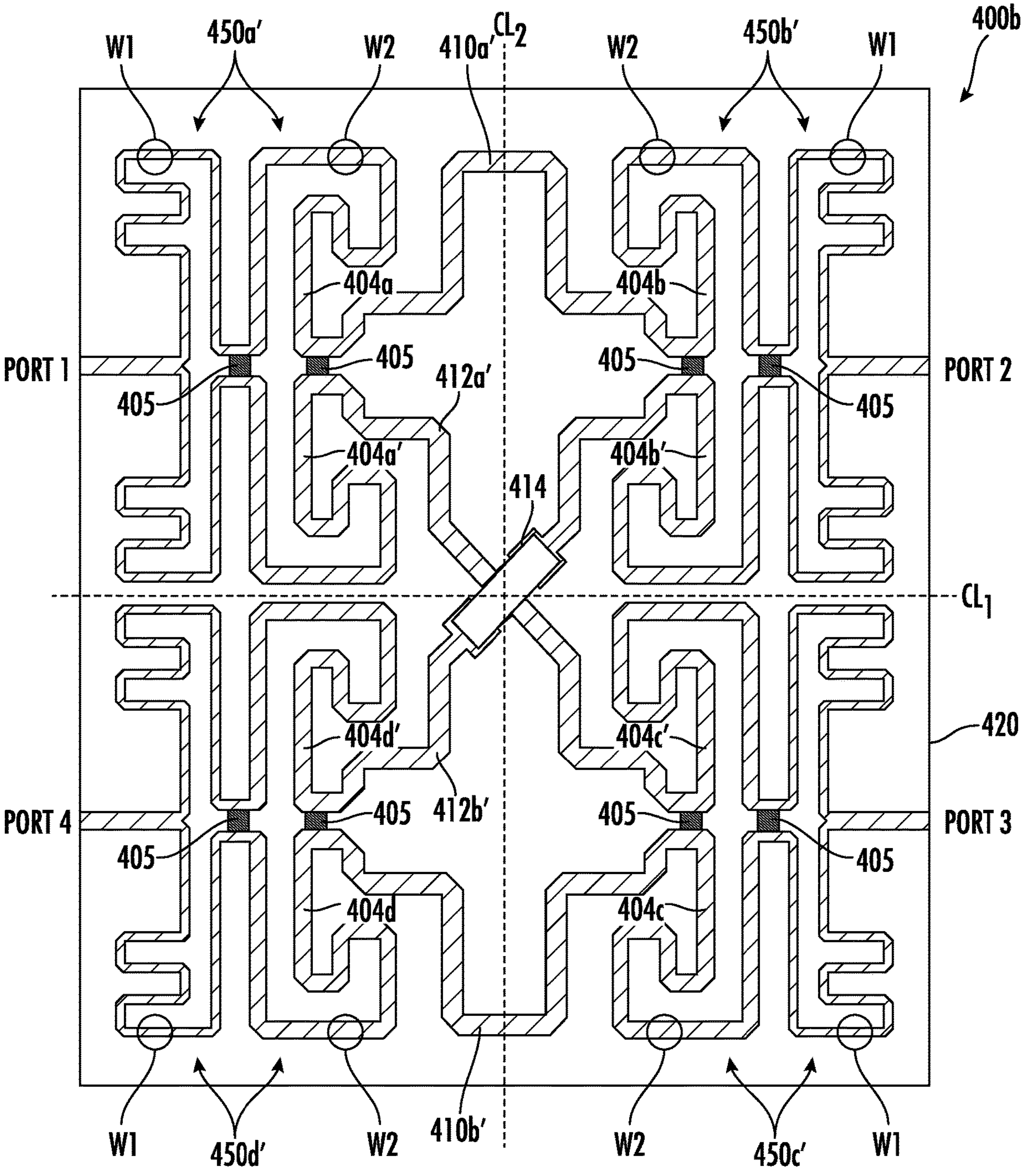
FIG. 4C is a top plan view of a 4-port hybrid coupler with multi-section Wilkinson power dividers, according to an embodiment of the invention.

Referring now to FIG. 4C, another 4-port RF hybrid coupler 400*b* utilizes a quad-arrangement of multi-section Wilkinson power dividers 450*a*', 450*b*', 450*c*' and 450*d*' having respective input ports corresponding to Port 1 through Port 4 of a substrate 420, and respective first through fourth pairs of output ports (404*a*, 404*a*'), (404*b*, 404*b*'), (404*c*, 404*c*') and (404*d*, 404*d*'), which provide equal output ratios and are electrically coupled to each other (at each section) via corresponding high resistance trace segments 405. In addition, each of the multi-section Wilkinson power dividers 450*a*', 450*b*', 450*c*' and 450*d*' includes a first section having trace segments with a first width W1, and a second section having trace segments with a second width W2 (greater than W1), as shown. A first primary trace 410*a*' is provided, which electrically connects a first output port 404*a* of the first multi-section power divider 450*a*' to a first output port 404*b* of the second multi-section power divider 450*b*', and a second primary trace 410*b*' is provided, which electrically connects a first output port 404*d* of the fourth multi-section power divider 450*d*' to a first output port 404*c* of the third multi-section power divider 450*c*'. Also, a first coupled trace 412*a*' is provided, which electrically connects a second output port 404*a*' of the first multi-section power divider 450*a*' to a second output port 404*c*' of the third multi-section power divider 450*c*', and a second coupled trace 412*b*' is provided, which electrically connects a second output port 404*d*' of the fourth multi-section power divider 450*d*' to a second output port 404*b*' of the second multi-section power divider 450*b*' (via a jumper segment 414). As shown, the first and second primary traces 410*a*', 410*b*' and the first and second coupled traces 412*a*', 412*b*' are mirror images of each other about a first centerline $CL_1$ of the substrate 420. And, the first and second coupled traces 412*a*', 412*b*' are mirror images of each other about a second centerline $CL_2$ of the substrate.

Figure 5A:
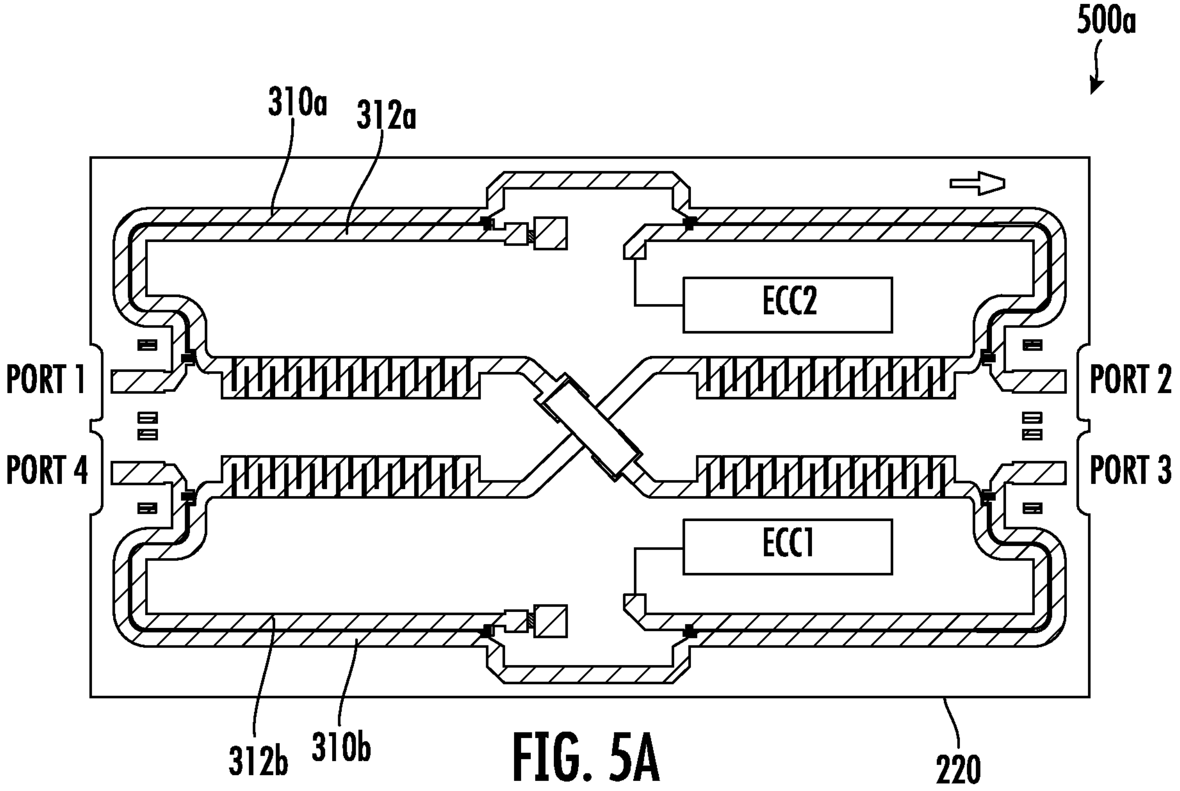
FIG. 5A is a plan view of a 4-port hybrid coupler that utilizes energy cancellation circuits (ECC) to provide termination to coupled traces, according to an embodiment of the invention.
Figure 5B:
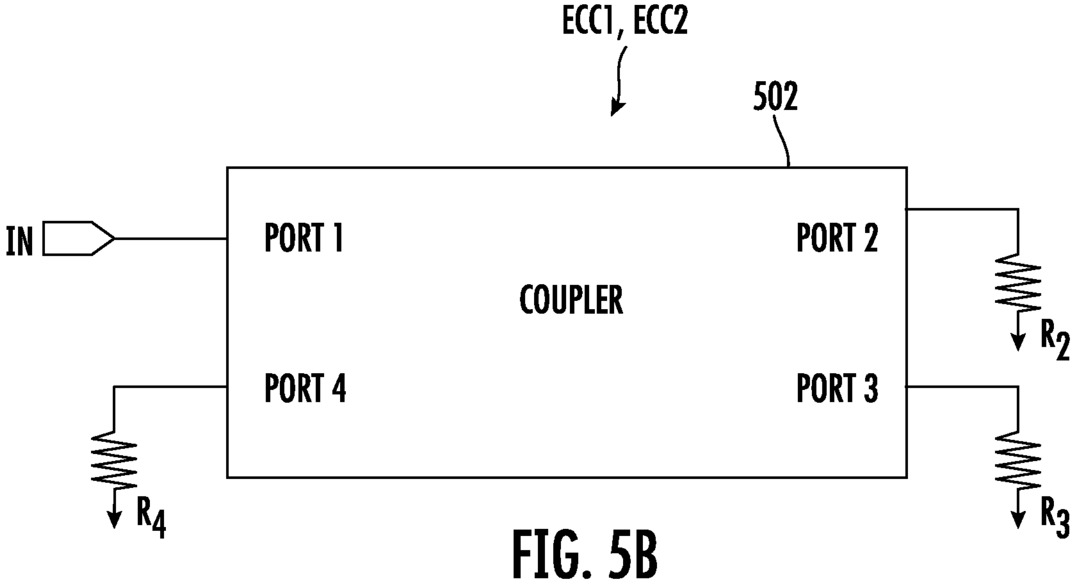
FIG. 5B is a block diagram of an energy cancellation circuit (with 4-port coupler), which may be used in the hybrid coupler embodiment of FIG. 5A.
Figure 5C:
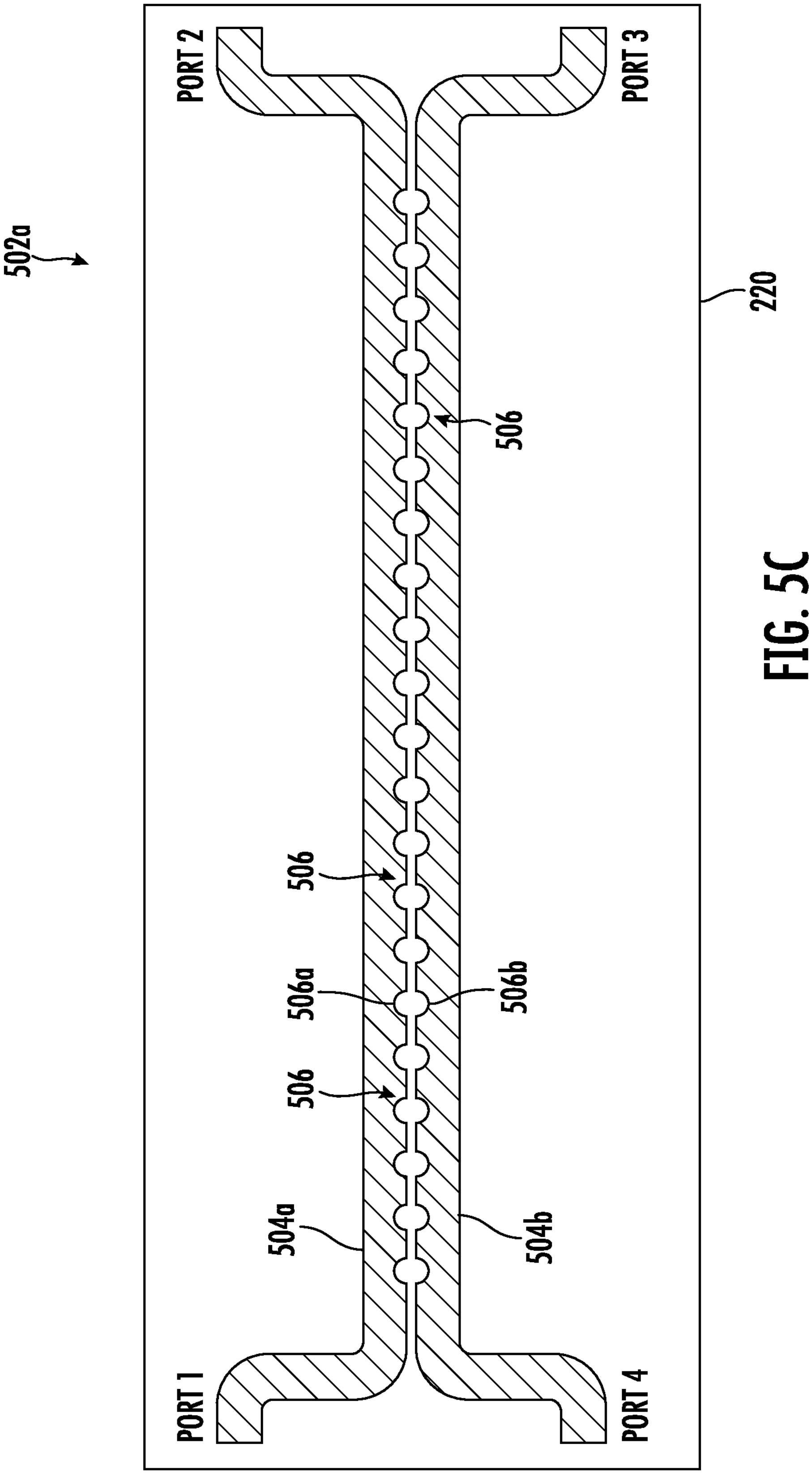
FIG. 5C is a plan view of an embodiment of a coupled-line coupler, which may be used within the energy cancellation circuit of FIG. 5B.

Referring now to FIGS. 5A-5C, an alternative example of a 4-port RF hybrid coupler 500*a* according to an embodiment of the invention is illustrated as being similar to the couplers 200, 300*a* of FIGS. 2A, 3A, but with: (i) traces 6*m*, 6*n*, 6*o*, and 6*o*', and terminations 6*p*, 6*p*' (and corresponding resistors R) associated with the first coupled trace 312*a*/212*a*, and (ii) traces 8*m*, 8*n*, 8*o* and 8*o*', and terminations 8*p*, 8*p*' (and corresponding resistors R) associated with the second coupled trace 312*b*/212*b* replaced by: a first energy cancellation circuit ECC1, and a second energy cancellation circuit ECC2, respectively. Advantageously, these first and second energy cancellation circuits ECC1, ECC2 are preferably configured to provide enhanced broadband signal termination with significantly reduced passive intermodulation (PIM) effects over a relatively wide frequency band relative to resistive traces (and resistive terminations) having relatively non-linear energy absorption characteristics across a frequency band.

According to some embodiments of the invention, the first and second energy cancellation circuits ECC1, ECC2 are each configured as a corresponding 4-port "termination" coupler 502 with 3-port resistive termination provided by resistors R2, R3 and R4 at Ports 2, 3 and 4, respectively, as shown by FIG. 5B. Moreover, the 4-port coupler 502 may be configured as a coupled-line coupler 502*a* including a pair of spaced-apart metal traces 504*a*, 504*b* (on a substrate (e.g., 220)) with "perforations" 506 extending therebetween along a majority length thereof, as shown by FIG. 5C, or as a branch-line coupler; however, other coupler configurations may also be utilized. As shown, the "perforations" 506 may be provided by a linear series of mirrored half-moon recesses 506*a*, 506*b* within each of traces 504*a*, 504*b*.

In particular, the 4-port "termination" coupler 502 may be configured such that: Port 1 is the input port IN, which is electrically connected to an end of the corresponding coupled trace 212*a*/312*a*, 212*b*/312*b*, Ports 2 and 3 are the through-port and coupling-port, respectively, which have −3 dB amplification and 90° phase shift and are connected to relatively high power resistors R2, R3 for termination, and Port 4 is the isolation port (ISO) associated with reduced energy, which only requires a relatively low power resistor R4 for termination.

Thus, as illustrated by FIGS. 5A-5C, a 4-port RF hybrid coupler 500*a* may be configured to include first and second primary traces 310*a*, 310*b* and first and second coupled traces 312*a*, 312*b* on a first surface of a substrate 220. The first primary trace 310*a* has first and second ends electrically coupled to first and second ports of the coupler 500*a*, respectively, and the second primary trace 310*b* has first and second ends electrically coupled to fourth and third ports of coupler 500*a*. Advantageously, the first coupled trace 312*a* has a first end configured to provide a first degree of RF coupling to the first end of the first primary trace 310*a* adjacent the first port when the coupler 500*a* is active, and a second end configured to provide a third degree of RF coupling to the second end of the second primary trace 310*b* adjacent the third port when the coupler 500*a* is active. Similarly, the second coupled trace 312*b* has a first end configured to provide a fourth degree of RF coupling to the first end of the second primary trace 310*b* adjacent the fourth port when the coupler 500*a* is active, and a second end configured to provide a second degree of RF coupling to the second end of the first primary trace 310*a* adjacent the second port when the coupler 500*a* is active. In addition, first and second energy cancellation circuits ECC1, ECC2 are provided for broadband signal/trace termination. The first energy cancellation circuit ECC1 includes a first termination coupler 502 having an input port IN electrically coupled to the second end of the second coupled trace 312*b*, whereas the second energy cancellation circuit ECC2 includes a second termination coupler 502 having an input port IN electrically coupled to the second end of the first coupled trace 312*a*. In some embodiments, the first and second termination couplers 502 are configured to have matching gain and phase characteristics relative to each other.

Figure 6A:
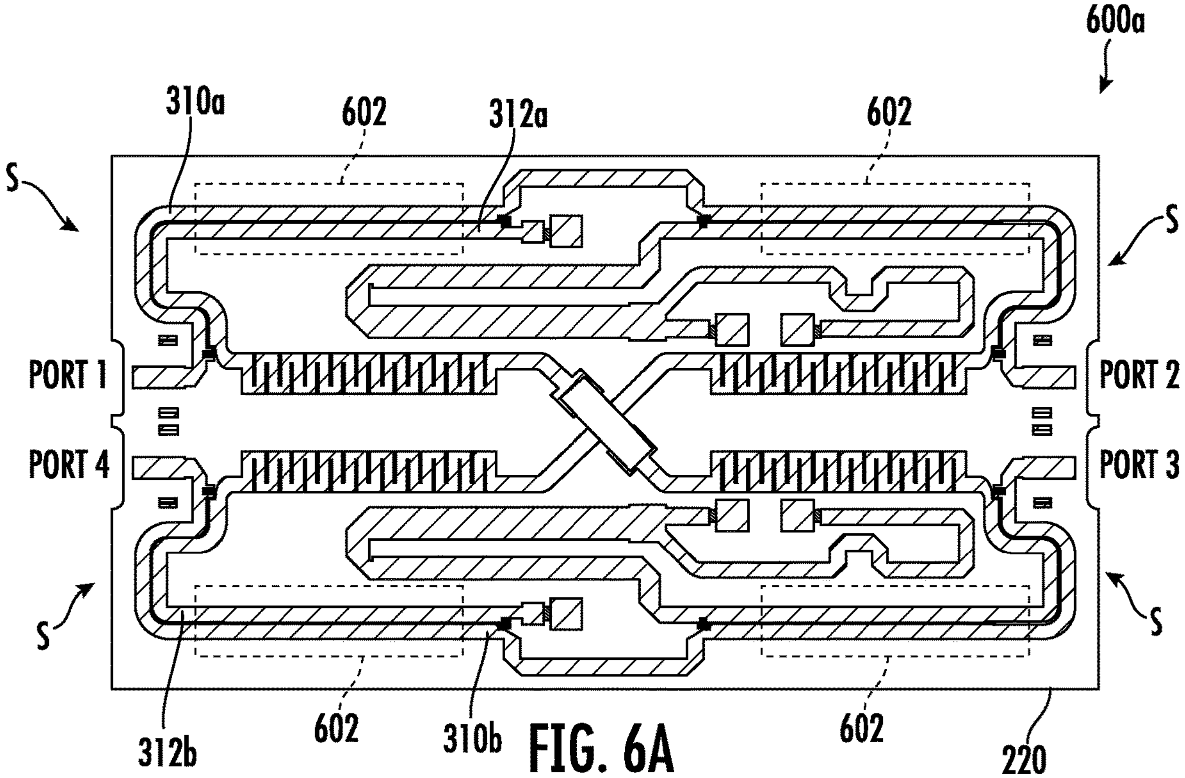
FIG. 6A is a plan view of a 4-port hybrid coupler, according to an embodiment of the invention.
Figure 6B:
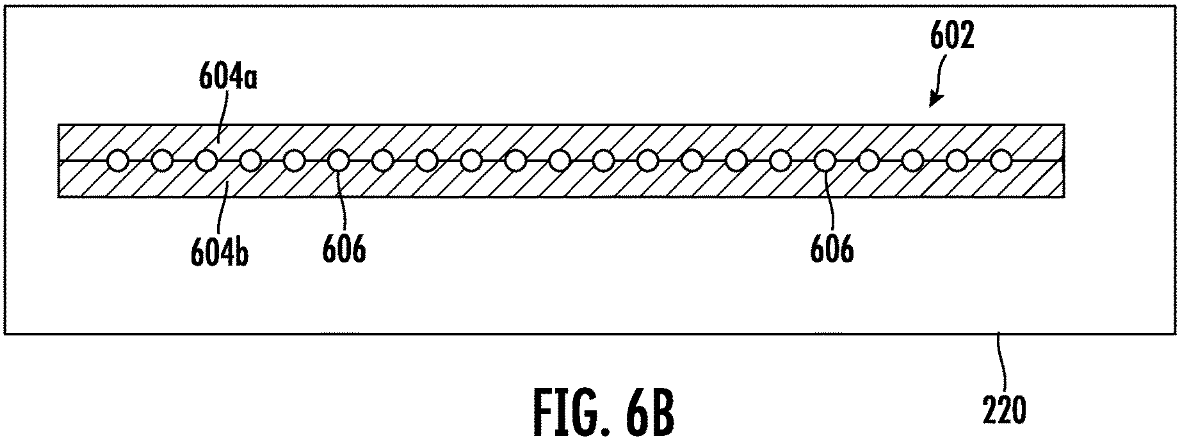
FIG. 6B is a top plan view of a coupled-line coupler, which may be used in the 4-port hybrid coupler of FIG. 6A.
Figure 6C:
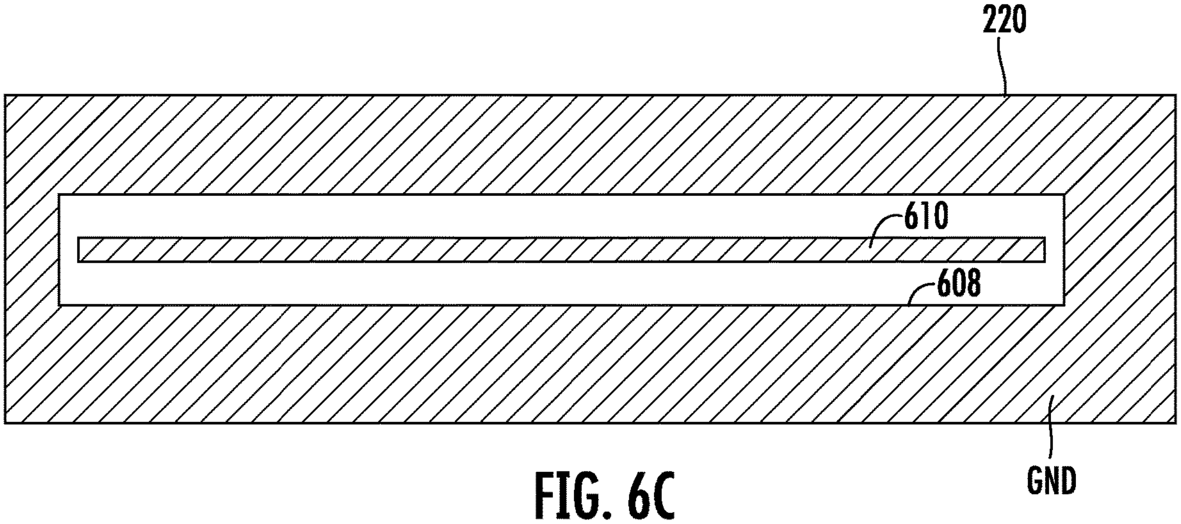
FIG. 6C is a bottom plan view of the coupled-line coupler of FIG. 6B.

Referring now to FIGS. 6A-6C, a 4-port RF hybrid coupler 600*a* according to a further embodiment of the invention is illustrated as being similar to the coupler 300*a* of FIG. 3A, but with trace segments within the primary traces 310*a*, 310*b* and corresponding trace segments within the coupled traces 312*a*, 312*b* replaced by corresponding coupled-line couplers 602. As shown by FIG. 6B, each coupled-line coupler 602 includes a pair of spaced-apart metal traces 604*a*, 604*b* (on a forward surface of a substrate 220) with "perforations" 606 extending therebetween, as shown by FIG. 6B (and FIG. 5C). And, as shown by FIG. 6C, a ground-plane cutout 608 with a centered and elongate trace 610 is provided on a rear surface of the substrate 220. Advantageously, this elongate trace 610 is preferably aligned to extend opposite the perforations 606 on the forward surface of the substrate 220; moreover, a length/width of the elongate trace 610 and the dimensions of the ground-plane cutout 608 may be adjusted to improve coupling (e.g., 5-7 dB) within the coupled-line coupler 602, and relative to the coupled-line coupler 502*a* of FIG. 5C.

Figure 7A:
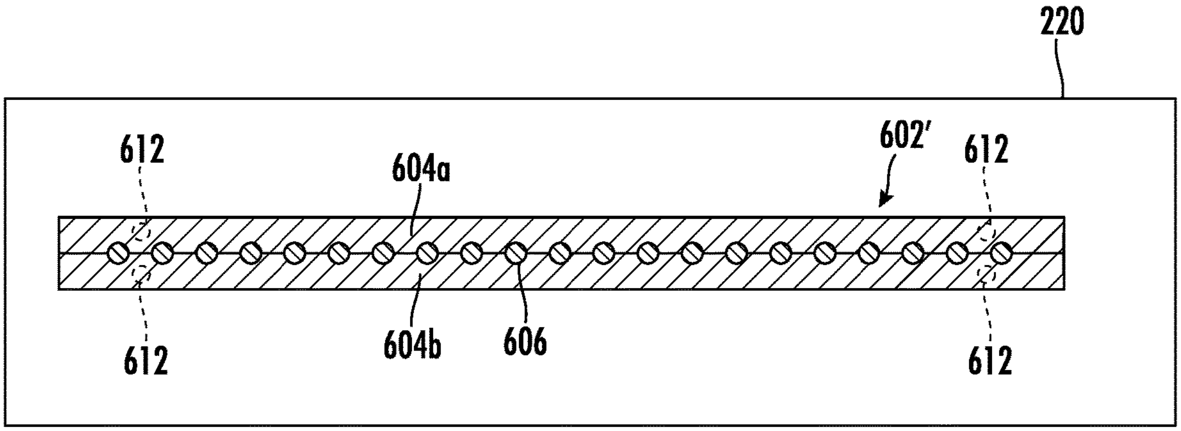
FIG. 7A is a top plan view of a coupled-line coupler, according to an embodiment of the invention.
Figure 7B:
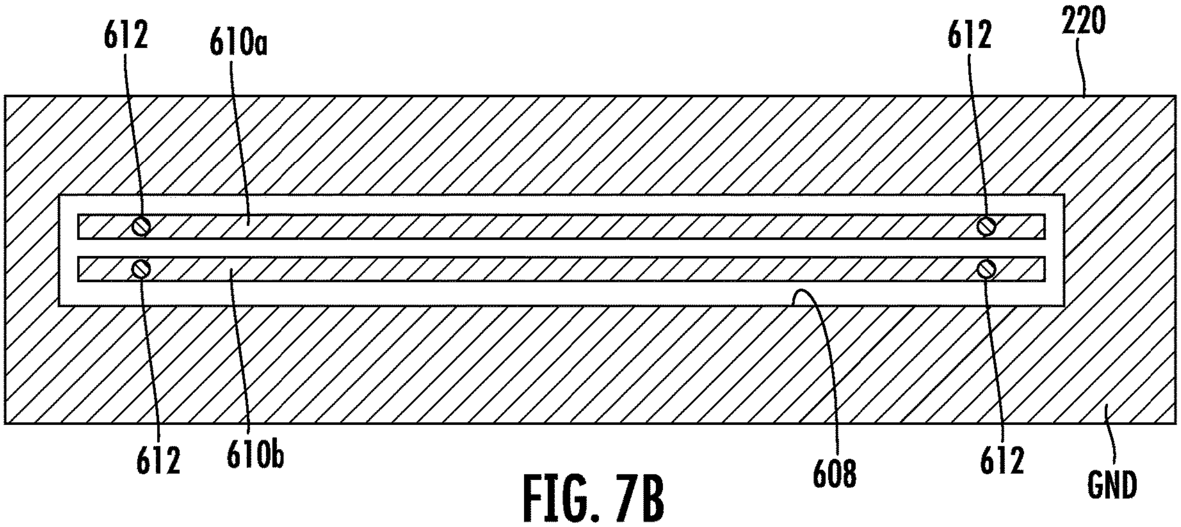
FIG. 7B is a bottom plan view of the coupled-line coupler of FIG. 7A.

Referring now to FIGS. 7A-7B, a coupled-line coupler 602' may also be utilized as an alternative to the coupled-line couplers 502*a* and 602 of FIGS. 5-6. This coupled-line coupler 602' is shown as including: (i) first and second elongate traces 610*a*, 610*b* within the ground-plane cutout/slot 608, and (ii) two pairs of plated through-holes 612 that electrically connect opposing ends of the metal traces 604*a*, 604*b* to opposing ends of the elongate traces 610*a*, 610*b* so that higher degrees of coupling are provided relative to the coupled-line couplers 502*a*, 602 of FIGS. 5C and 6B-6C, respectively. In addition, although not shown, an elongate trace that faces the metal traces 604*a*, 604*b* may be provided on a top substrate, which is connected to the substrate 220 by a rivet, for example, so that a wiper function can be provided that supports higher, and adjustable, coupling within the coupled-line coupler 602'.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A four-port radio-frequency (RF) hybrid coupler, comprising:

a substrate;

a first primary trace on a first surface of the substrate, said first primary trace having first and second ends electrically coupled to first and second ports of the RF hybrid coupler, respectively;

a second primary trace on the first surface of the substrate, said second primary trace having first and second ends electrically coupled to fourth and third ports of the RF hybrid coupler, respectively;

a first coupled trace on the first surface of the substrate, said first coupled trace having: (i) a first end configured to provide a first degree of RF coupling to the first end of the first primary trace adjacent the first port when the RF hybrid coupler is active, and (ii) a second end configured to provide a third degree of RF coupling to the second end of the second primary trace adjacent the third port when the RF hybrid coupler is active;

a second coupled trace on the first surface of the substrate, said second coupled trace having: (i) a first end configured to provide a fourth degree of RF coupling to the first end of the second primary trace adjacent the fourth port when the RF hybrid coupler is active, and (ii) a second end configured to provide a second degree of RF coupling to the second end of the first primary trace adjacent the second port when the RF hybrid coupler is active; and a first energy cancellation circuit comprising a first termination coupler having an input port electrically coupled to the second end of the second coupled trace.

2. The coupler of claim 1, further comprising:

a second energy cancellation circuit comprising a second termination coupler having an input port electrically coupled to the second end of the first coupled trace.

3. The coupler of claim 1, wherein the first termination coupler is a four-port coupler having through, coupling and isolation ports terminated by respective resistors.

4. The coupler of claim 3, wherein at least one of the resistors terminating the through and coupling ports of the first termination coupler is a relatively high-power resistor; and wherein the resistor terminating the isolation port is a relatively low-power resistor.

5. The coupler of claim 1, wherein the first termination coupler is selected from a group consisting of branch-line couplers and coupled-line couplers.

6. The coupler of claim 5, wherein the first termination coupler is a 3 db coupler.

7. The coupler of claim 2, wherein the second termination coupler is selected from a group consisting of 3 dB branch-line couplers and 3 dB coupled-line couplers.

8. The coupler of claim 7, wherein the first and second termination couplers have matching gain and phase characteristics; and wherein each of the first and second termination couplers includes through, coupling and isolation ports terminated by respective resistors.

9. A four-port radio-frequency (RF) hybrid coupler, comprising:

a substrate;

first and second primary traces on a first surface of the substrate;

a first coupled trace on the first surface of the substrate, said first coupled trace having: (i) a first end configured to provide a first degree of RF coupling to a first end of the first primary trace when the RF hybrid coupler is active, and (ii) a second end configured to provide a third degree of RF coupling to a second end of the second primary trace when the RF hybrid coupler is active;

a second coupled trace on the first surface of the substrate, said second coupled trace having: (i) a first end configured to provide a fourth degree of RF coupling to the first end of the second primary trace when the RF hybrid coupler is active, and (ii) a second end configured to provide a second degree of RF coupling to the second end of the first primary trace when the RF hybrid coupler is active;

a first energy cancellation circuit comprising a first termination coupler having an input port electrically coupled to an end of the second coupled trace; and a second energy cancellation circuit comprising a second termination coupler having an input port electrically coupled to an end of the first coupled trace.

10. The coupler of claim 9, wherein the first and second termination couplers having matching gain and phase characteristics; and wherein each of the first and second termination couplers includes through, coupling and isolation ports terminated by respective resistors.

11. A four-port radio-frequency (RF) hybrid coupler, comprising:

a substrate;

a first primary trace on a first surface of the substrate, said first primary trace having first and second ends electrically coupled to first and second ports of the coupler, respectively;

a second primary trace on the first surface of the substrate, said second primary trace having first and second ends electrically coupled to fourth and third ports of the coupler, respectively;

a first coupled trace on the first surface of the substrate, said first coupled trace having: (i) a first end comprising a plurality of trace segments connected in series, which collectively provide a first degree of RF coupling to the first end of the first primary trace adjacent the first port when the coupler is active, and (ii) a second end comprising a plurality of trace segments connected in series, which collectively provide a third degree of RF coupling to the second end of the second primary trace adjacent the third port when the coupler is active, which is unequal to the first degree of RF coupling; and a second coupled trace on the first surface of the substrate, said second coupled trace having: (i) a first end comprising a plurality of trace segments connected in series, which collectively provide a fourth degree of RF coupling to the first end of the second primary trace adjacent the fourth port when the coupler is active, and (ii) a second end comprising a plurality of trace segments connected in series, which collectively provide a second degree of RF coupling to the second end of the first primary trace adjacent the second port when the coupler is active, which is unequal to the fourth degree of RF coupling.

12. The coupler of claim 11, wherein the first and fourth ports extend adjacent a first side of the substrate, and the second and third ports extend adjacent a second side of the substrate, opposite the first side; wherein the first end of the first coupled trace is a mirror-image of a first end of the second coupled trace, relative to a first centerline extending between the first and second primary traces; and wherein the second end of the first coupled trace is a mirror-image of a second end of the second coupled trace, relative to the first centerline.

13. The coupler of claim 12, wherein the first coupled trace comprises a first pair of serpentine-shaped trace segments, which are electrically coupled in series with each other; and wherein the second coupled trace comprises a second pair of serpentine-shaped trace segments, which are electrically coupled in series with each other.

14. The coupler of claim 13, wherein the first pair of serpentine-shaped trace segments are electrically connected end-to-end by an electrically conductive jumper, which is spaced above the first surface of the substrate, or the second pair of serpentine-shaped trace segments are electrically connected end-to-end by an electrically conductive jumper, which is spaced above the first surface of the substrate.

15. The coupler of claim 13, wherein the first pair of serpentine-shaped trace segments extend in series and between the first and second ends of first coupled trace; and wherein the second pair of serpentine-shaped trace segments extend in series and between the first and second ends of second coupled trace.

16. The coupler of claim 11, wherein the first end of the first primary trace comprises first and second linear trace segments that are joined together by an elbow-shaped trace segment; wherein the first end of the first coupled trace comprises first and second linear trace segments that are joined together by an elbow-shaped trace segment; and wherein the first and second linear trace segments within the first primary trace extend parallel to the first and second linear trace segments within the first coupled trace, respectively.

17. The coupler of claim 16, further comprising a ground plane on a second surface of the substrate, said ground plane having a rectangular-shaped or ladder-shaped opening therein, which extends opposite a parallel combination of the second linear trace segment within the first primary trace and the second linear trace segment within the first coupled trace.

18. The coupler of claim 11, wherein the substrate is a rectangular-shaped substrate having lateral dimensions of less than 130 mm by less than 75 mm.

19. The coupler of claim 11, wherein the substrate is a rectangular-shaped substrate having an area of less than 10,000 $mm^2$.

20. The coupler of claim 12, wherein the first end of the first coupled trace is not a mirror-image of a second end of the second coupled trace, relative to a second centerline extending between the first and second ports of the coupler; and wherein the first end of the second coupled trace is not a mirror-image of a second end of the first coupled trace, relative to the second centerline.

* * * * *